United States Patent [19]

Yang

[11] Patent Number: 5,105,125
[45] Date of Patent: Apr. 14, 1992

[54] DEVICE FOR ALTERNATING BULB POLARITIES OF A DC LIGHTING SYSTEM

[76] Inventor: Tai-Her Yang, 5-1 Taipin St., Si-Hu Town, Dzan-Hwa, Taiwan

[21] Appl. No.: 562,724

[22] Filed: Aug. 6, 1990

[51] Int. Cl.⁵ .......................... H05B 41/36
[52] U.S. Cl. ................. 315/209 R; 315/287; 315/307; 315/DIG. 5
[58] Field of Search ........ 315/209 R; 287, 205, 315/224, 291, DIG. 5, 307, 246, 210, 216, 268, 315

[56] References Cited

U.S. PATENT DOCUMENTS 4,356,432  10/1982  Vinarub .......................... 315/287

Primary Examiner—Eugene R. LaRoche
Assistant Examiner—Ali Neyzari
Attorney, Agent, or Firm—Leonard Bloom

[57] ABSTRACT

A device for alternating the polarity of an illuminated DC fluorescent light bulb to eliminate cathodic degeneration while avoiding the visible effects of flicker to maintain a constant lighting effect.

3 Claims, 1 Drawing Sheet

DEVICE FOR ALTERNATING BULB POLARITIES OF A DC LIGHTING SYSTEM

BACKGROUND OF THE INVENTION

1. Field of the invention

The present invention relates to DC lighting systems, and more particularly, to a device for periodically alternating the polarity of a DC power signal used to drive a DC light bulb.

2. Description of the Background

Fluorescent lighting systems are in wide use due to the high-efficiency cool light which is generated. Conventional fluorescent lighting systems may be one of two types including those operated from AC power, or those operated from DC power. AC-powered systems are the most common in houses, factories and public places. However, AC-powered systems are prone to flicker, which may result in harm to the eyes. In contrast, the continuous DC signal applied to DC systems solves the problem of flicker because the bulb is always biased with a signal of the same polarity. Unfortunately, the advantage of uniform polarity does not come without cost. When a constant power signal is applied to a fluorescent bulb, severe aging and eventual degradation of the cathode will result.

It would be greatly advantageous to provide a solution to the above-described problem, and co-pending U.S. Patent Application Ser. No. 07/575,425 attempts such a solution with a device for periodically alternating bulb polarities of a DC fluorescent lighting system. Disclosed therein is a means for randomly setting the bulb polarity of a fluorescent light bulb prior to application of power. When power is applied, either bulb terminal has an equal chance of becoming the cathode. This results in uniform degradation of the cathode over time.

It would be equally advantageous if the bulb polarity could be alternated more frequently than at each power-up. However, for this a solution must be provided for the problem of flicker which is inherent in AC fluorescent lighting systems.

SUMMARY OF THE INVENTION

Accordingly, it is an object of the present invention to provide a device for alternating the polarity of an illuminated DC fluorescent light bulb while maintaining a steady lighting effect.

It is another object of the present invention to eliminate flicker due to the periodic reversal of polarity as in AC fluorescent lighting systems while avoiding the problem of unilateral degradation of bulb terminals created by fixed DC power.

BRIEF DESCRIPTION OF THE DRAWINGS

Other objects, features and advantages of the present invention will become more apparent from the following detailed description of preferred embodiments and certain modifications thereof when taken together with the accompanying drawings, in which.

DETAILED DESCRIPTION OF THE PREFERRED EMBODIMENT

Figure 1:
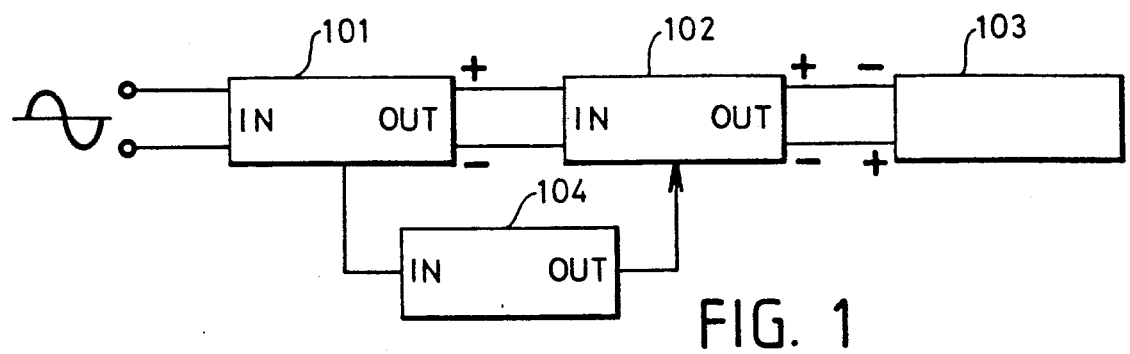
FIG. 1 is a block circuit diagram of the preferred embodiment of the present invention.

Referring to FIG. 1, a block circuit diagram of the preferred embodiment of the present invention is shown.

DC power supply unit 101 may be any power supply capable of generating the requisite DC power for driving a fluorescent light. Preferably, power supply 101 provides direct rectification and filtering of power supplied from a conventional AC source.

Polarity switch 102 is connected directly to the output terminals of power supply 101. Polarity switch 102 may be an electrodynamic-type relay or any other circuit capable of selectively switching the polarity of DC power input from power supply 101.

Lighting apparatus 103 is connected to the output of polarity switch 102 for receiving power of a selected polarity therefrom. Lighting apparatus 103 may be a conventional fluorescent light assembly including a bulb holder, a fluorescent bulb carried by the bulb holder, a limiter, a power cord, and a cover.

Polarity signal setting device 104 is connected between power supply 101 and polarity switch 102 for selecting the polarity of DC power supplied to lighting apparatus 103 by controlling the position of switch 102, thereby switching the polarity of DC power input from power supply 101.

Polarity signal setting device 104 comprises a random number generator capable of outputting a randomly selected HIGH or LOW signal and driving polarity switch 102 with the HIGH or LOW signal for predetermined length of time.

In operation, power supply 101 provides a regulated DC (+) and (−) output from, for example, a single phase AC supply. The regulated DC power is supplied to polarity switch 102. Polarity switch 102 switches the regulated DC power through to lighting apparatus 103 in accordance with the HIGH or LOW control signal supplied by polarity signal setting device 104. For example, if the polarity signal setting device 104 outputs a HIGH signal, a control signal, polarity switch 102 will switch the regulated DC power directly through to lighting apparatus 103. Conversely, if the polarity signal setting device 104 outputs a LOW signal, polarity switch 102 will reverse the polarity of the regulated DC power supplied to lighting apparatus 103.

Polarity signal setting device 104 determines the positive and negative polarities of the regulated DC power supplied to lighting apparatus 103 in accordance with an internal or external timing means (not shown). In the preferred embodiment, the timing means is internal to polarity signal setting device 104 and is simply a combination clock/timer which generates a higher frequency timing signal for a predetermined amount of time after power is applied to power supply 101. The higher frequency timing signal is supplied during the initial power-up of the lighting apparatus 103. This way, the terminals of the bulb alternately serve as cathode and anode, and degradation is greatly reduced in the same manner as an AC fluorescent lighting system. However, to eliminate the ensuing problem of flicker, the timing means internal to the polarity signal setting device 104 reduces the frequency of the timing signal after initial power-up has occurred. The lower frequency timing signal is thereafter supplied as long as the system remains illuminated. As before, the terminals of the bulb alternately serve as cathode and anode, and degradation is reduced.

In addition, the lower frequency of the timing signal eliminates the noticeable effect of flicker.

Figure 2:
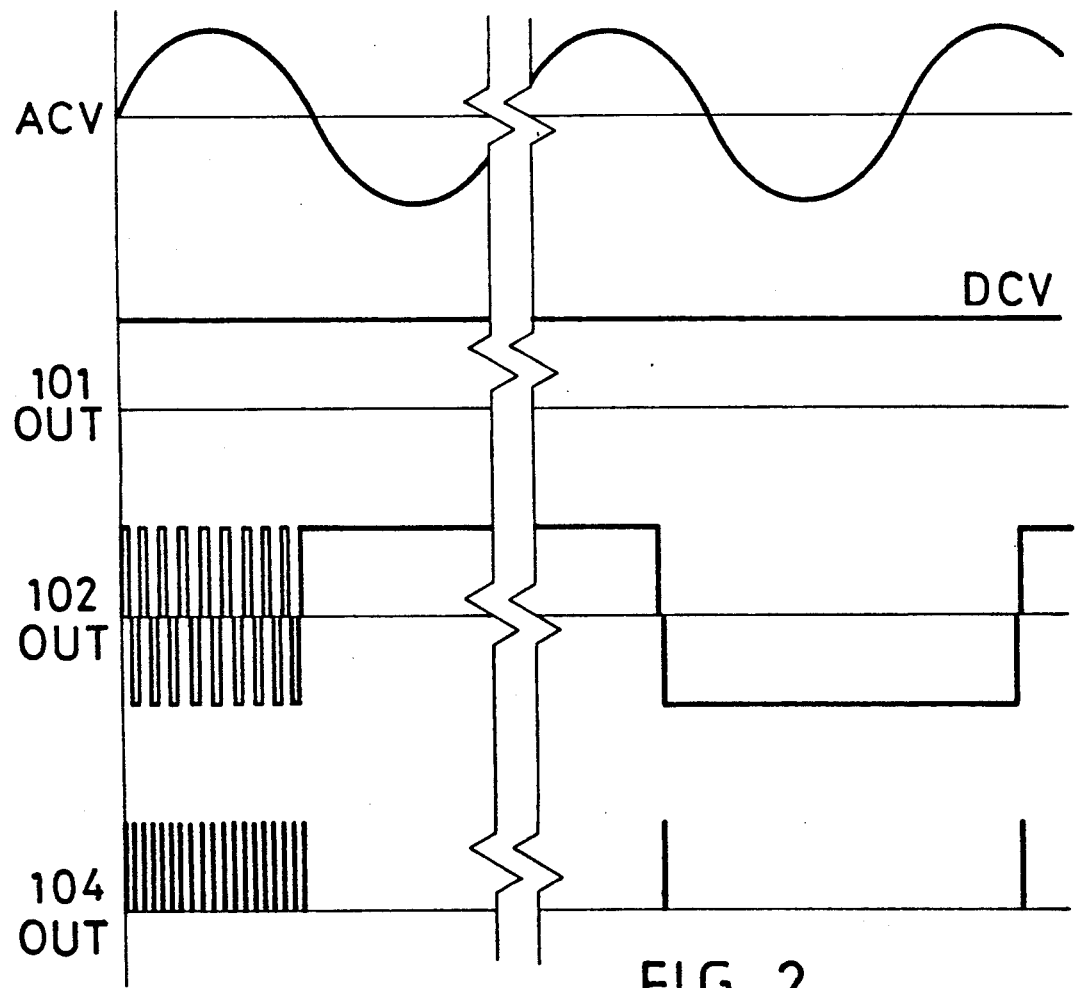
FIG. 2 is a trace diagram of the output signals from the various circuit blocks of FIG. 1 illustrating the timing of the alternating polarity signal used for driving a fluorescent light or other lighting apparatus.

Referring to FIG. 2, the output signals from the various circuit blocks of FIG. 1 are shown to illustrate the essential timing of the above-described device. The AC signal A is supplied from a conventional AC power source to power supply 101. Power supply 101 regulates and filters the AC power signal A, and outputs a regulated DC power signal B to polarity switch 102.

At the same time that the AC signal A is applied to power supply 101, polarity signal setting device 104 begins to supply timing signals (as shown in graph D) to polarity switch 102.

As illustrated by signal C, each time a timing signal D is supplied from polarity signal setting device 104, polarity switch 102 reverses the polarity of its output signal which is applied to lighting apparatus 103.

Initially, and for a short time after AC power signal A is first applied to power supply 101, timing signals D are supplied from polarity setting signal device 104 at a high frequency, for example, 5 KHZ. Hence, polarity switch 102 will reverse the polarity of the output signal applied to lighting apparatus 103 at a high rate during initial illumination, thereby reducing degeneration at the bulb terminals.

After the lighting apparatus 103 has been fully illuminated, timing signals D are supplied from polarity setting signal device 104 at a lower frequency, for example, once every 180 seconds. Polarity switch 102 then continues to reverse the polarity of the output signal applied to lighting apparatus 103 at the lower rate, thereby eliminating visible flicker.

It should be noted that other suitable frequencies may be selected, and frequencies may be gradually reduced after initial illumination. Moreover, the above-described device may be equally applicable in other types of lighting systems besides conventional fluorescent systems, such as opal lamps, mercury lamps, air discharge lights, arc lamps, etc.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. A direct current lighting system, comprising:
   a power supply for receiving input power and for converting said input power into a regulated DC power signal capable of driving a lamp;
   a light assembly including a lamp;
   a polarity switch connected between said power supply and said light assembly for conveying said DC power signal therebetween, and for controllably reversing a polarity of said DC power signal applied to said light assembly; and
   a polarity controller connected between said power supply and said polarity switch for controlling said polarity switch, said polarity controller further comprising,
   a random number generator for randomly setting said polarity switch upon initial application of input power to said power supply to convey one of a forward polarity or reverse polarity of said DC power signal to said light assembly upon initial application of input power to said power supply,
   timing means for periodically switching said polarity switch, said timing means further comprising a clock coupled to an interval timer for generating pulses at a first frequency during a predetermined time interval following initial application of said input power to said power supply, and for generating pulses at a lower second frequency after said time interval.

2. The direct current lighting system according to claim 1, wherein said first frequency is approximately 5 KHZ and said lower second frequency is approximately 0.0028 HZ.

3. The direct current lighting system according to claim 2, wherein said timing means further comprises a clock coupled to an interval timer for generating pulses at a gradually decreasing frequency following initial application of said input power to said power supply.

* * * * *